United States Patent [19]

Yagami et al.

[11] Patent Number: 5,133,791
[45] Date of Patent: Jul. 28, 1992

[54] METHOD FOR MAKING SURFACE-REINFORCED GLASS

[75] Inventors: Kojiro Yagami; Chitatsu Sano; Toshiya Tamura, all of Yamanashi, Japan

[73] Assignee: TDK Corporation, Tokyo, Japan

[21] Appl. No.: 741,629

[22] Filed: Aug. 7, 1991

Related U.S. Application Data

[62] Division of Ser. No. 473,472, Feb. 1, 1990, Pat. No. 5,055,958.

[30] Foreign Application Priority Data

| Mar. 31, 1989 | [JP] | Japan | 1-82754 |
| Mar. 31, 1989 | [JP] | Japan | 1-82755 |
| Oct. 27, 1989 | [JP] | Japan | 1-280811 |
| Oct. 27, 1989 | [JP] | Japan | 1-280812 |

[51] Int. Cl.$^5$ ............................................. C03C 25/04
[52] U.S. Cl. .................................... 65/30.1; 65/30.13; 65/60.5; 65/60.8
[58] Field of Search .................... 65/30.1, 30.11, 30.13, 65/30.14, 60.5, 60.8; 360/122, 103

[56] References Cited

U.S. PATENT DOCUMENTS

| 2,834,689 | 5/1958 | Jupnik | 65/30.1 X |
| 3,573,948 | 4/1971 | Tarnopol | 65/30.1 X |
| 4,014,772 | 3/1977 | Woods et al. | 65/30.1 X |
| 4,028,080 | 6/1977 | DiVita et al. | 65/2 |
| 4,092,139 | 5/1978 | Ference | 65/30.1 |
| 4,188,452 | 2/1980 | Groth | 65/60.8 X |
| 4,874,417 | 10/1989 | Winterburn | 65/30.14 X |

Primary Examiner—Robert L. Lindsay
Attorney, Agent, or Firm—Oblon, Spivak, McClelland, Maier & Neustadt

[57] ABSTRACT

Glass is surface reinforced by providing a surface layer which contains an oxide component, typically silicon oxide in more excess than the underlying base glass, the oxide component exhibiting higher chemical or mechanical durability than the base glass itself. A surface of glass is tailored by a dry process, typically by exposure to UV radiation in the presence of ozone such that the oxide component is present more at the surface than in the underlying glass while a heavy metal such as Pb is driven out. A magnetic head having such a surface-reinforced sealing glass for bonding a core block to a slider is highly reliable.

15 Claims, 5 Drawing Sheets

METHOD FOR MAKING SURFACE-REINFORCED GLASS

This is a division of application Ser. No. 07/473,472, filed on Feb. 1, 1990 now U.S. Pat. No. 5,055,958, granted Oct. 8, 1991.

This invention relates to surface-reinforced glass and a method for reinforcing glass surface. It also relates to a magnetic head having surface-reinforced glass disposed at the sliding surface and a method for making the same.

BACKGROUND OF THE INVENTION

Many glass articles and articles containing glass are required to present a glass surface having excellent chemical and mechanical durability. Glass has a general tendency that a glass surface machined as by cutting and polishing is markedly reduced in chemical and mechanical durability as compared with the base glass. This tendency becomes more outstanding with glasses having lower working temperatures Tw. It is to be noted that the working temperature Tw of glass used herein is a temperature at which the glass exhibits a viscosity of $10^4$ poise. It is thus desired to reinforce a machined surface of glass.

Several methods for reinforcing a glass surface are known in the art including ion exchange, ion implantation, and surface quenching. It is also possible to control a glass composition so as to reinforce the entire glass. However, control of glass composition for improved chemical and mechanical durability is somewhat limitative because the glass must meet the thermal properties required for each type of article. The composition control can improve chemical and mechanical durability to a certain, but limited extent, failing to provide sufficient durability.

As opposed to the reinforcement of an entire glass mass, the reinforcement of only a glass surface leaves an increased degree of freedom to the feasibility of glass composition because in most techniques, the physical properties of the base glass are negligible. However, conventional techniques like ion exchange, ion implantation, and surface quenching are applicable to only limited objects.

The ion exchange technique is useful to glasses containing a substantial amount of alkali metals such as sodium, and often applied to glasses having a relatively high working temperature Tw. However, the ion exchange is ineffective to glasses having reduced contents of alkali metals, especially alkali-free glasses and glasses having low working temperatures cannot withstand the ion exchange process. The glasses to which the ion exchange technique can be applied are only those having a composition meeting the necessary conditions.

The ion implantation technique is a less productive technique requiring a large size of equipment. When it is applied to articles partially containing glass, for example, magnetic heads, ions are implanted to undesired portions other than the glass surface, with possible deterioration of the articles.

The surface quenching technique is difficult to apply to glass having a low working temperature. If glass joined or bonded to another material is quenched, the differential thermal behavior would create stresses to induce cracks in the glass.

The prior art method for reinforcing only a glass surface is predominantly to enhance the mechanical durability of glass. Even if the treatment is successfully done under various limitations, the result is yet insufficient with respect to chemical durability.

The prior art methods are least successful in surface reinforcement of glass having a low melting point or working temperature, for example, high lead glass.

Magnetic heads are generally constructed by mating core halves with welding glass into a core block and joining the core block to a slider with sealing glass. Welding or sealing glass forming the seal, weld or joint between magnetic head components is required to have enough chemical durability to maintain the reliability and performance of the magnetic head. In the case of composite type magnetic heads, for example, the sealing glass which is exposed at the sliding or front surface is required to have high chemical durability at the surface. If the sealing glass exposed at the sliding surface of a magnetic head is degraded or deteriorated or accompanied by formation of foreign matter at the surface due to weathering, corrosion or the like, the magnetic head loses reliability.

A machined surface of glass, for example, a mirror polished surface of glass on the sliding face of a magnetic head is markedly reduced in chemical durability as compared with the base glass. The glass exposed on the magnetic head sliding face is also required to have high mechanical strength and abrasion resistance. The sealing glass used in those areas of the magnetic head sliding face where the glass is exposed is preferably an alkali-free glass having a low working temperature Tw. However, glasses having low working temperatures are generally less durable, especially less chemically durable. Magnetic heads using such a low working temperature sealing glass thus become less reliable.

An attempt was made in the prior art to improve the durability, especially chemical durability of sealing glass by modulating the glass composition. However, modulation of glass composition for improved chemical durability is somewhat limitative because the glass must also meet the thermal properties required as the sealing glass. The composition modulation can improve chemical durability to a certain, but limited extent, failing to provide sufficient chemical durability.

In addition to the reinforcement of an entire glass mass by composition control, it is also attempted to reinforce only a surface of glass. As mentioned above, the surface reinforcement by composition control has a certain limit because the physical properties of an entire glass must be taken into account. In turn, the reinforcement of only a glass surface can be done by some techniques without paying much attention to the physical properties of an entire glass, leaving an increased degree of freedom to the feasibility of glass composition.

Known techniques for glass surface reinforcement include ion exchange, ion implantation, and surface quenching. However, these techniques are almost impossible to apply to magnetic heads where the glass to be surface reinforced is exposed at the sliding face.

The ion exchange technique is useful to glasses containing substantial amounts of alkali metals such as sodium. However, the ion exchange is ineffective to the sealing glass which favors a less alkali metal content. Low working temperature glass for magnetic head sealing cannot withstand the ion exchange.

The ion implantation technique is a less productive technique requiring a large size of equipment. When it is applied to magnetic heads, ions are implanted to undesired portions other than the sealing glass surface, for example, ferrite core block sliding areas with the likelihood of degrading magnetic properties.

The surface quenching technique is difficult to apply to glass having a low working temperature (Tw 600° C. or lower) such as a high lead content, low-melting point glass for magnetic head sealing. If the sealing glass joined or bonded to another material in a magnetic head is quenched, the differential thermal behavior would create stresses to induce cracks in the glass.

SUMMARY OF THE INVENTION

Therefore, a primary object of the present invention is to provide a surface reinforced glass having a wide range of composition and a wide spectrum of physical properties and presenting a surface having excellent durability, especially chemical durability.

Another object of the present invention is to provide a method for reinforcing a surface of glass, especially a glass surface reinforcing method effective in improving the chemical durability of a high lead glass having a relatively low working temperature.

A further object of the present invention is to provide a novel and improved magnetic head wherein the sealing glass exposed at the sliding face has improved durability, especially chemical durability at the surface substantially irrespective of the composition and physical properties of the base glass.

A still further object of the present invention is to provide a method for preparing the magnetic head.

According to a first aspect of the present invention, there is provided a surface-reinforced glass having a surface layer on an underlying base glass containing at least one oxide component, wherein the surface layer contains more the oxide component than the base glass, the oxide component exhibiting higher chemical or mechanical durability than the base glass itself.

Preferably, the oxide component is silicon oxide. Preferably, the surface layer contains at least 90% by weight of silicon oxide. The invention is more successfully applicable to a base glass containing at least 2% by weight of silicon oxide, especially 4 to 35% by weight of $SiO_2$ and 40 to 85% by weight of at least one member selected from the group consisting of PbO, $Bi_2O_3$, $Tl_2O$, CdO, and $TeO_2$. Preferably, the base glass has a working temperature of from 400° to 700° C.

According to a second aspect of the present invention, there is provided a method for surface reinforcing a glass containing at least one oxide component, comprising the step of tailoring a surface of the glass by a dry process such that the oxide component is present more at the surface than in the underlying glass, the oxide component exhibiting higher chemical or mechanical durability than the glass itself.

Preferably, the dry process includes exposure to active radiation. Preferably, the exposure to active radiation includes exposing the glass surface to ultraviolet radiation and ozone, more preferably exposure to ultraviolet rays having a wavelength in the range of 170 to 190 nm and a wavelength in the range of 250 to 270 nm thereby providing continuous formation and decomposition of ozone.

According to a third aspect of the present invention, there is provided a magnetic head presenting a sliding surface and having a glass incorporated therein, said glass having a surface layer on an underlying base glass containing at least one oxide component, wherein the surface layer contains more said oxide component than the base glass, said oxide component exhibiting higher chemical or mechanical durability than the base glass itself.

Preferably, the glass is exposed on the sliding surface. Preferably, the head further includes a core block having a pair of opposed ends in a track longitudinal direction and a pair of opposed ends in a track transverse direction, and the glass is disposed contiguous to at least one of the core block ends. Preferably, the head further includes a core block having a junction between core halves, and the glass is disposed at the junction.

According to a fourth aspect of the present invention, there is provided a method for preparing a magnetic head comprising the steps of assembling magnetic head components with a glass into a magnetic head, said glass containing at least one oxide component, and tailoring an exposed surface of the glass by a dry process such that said oxide component is present more at the surface than in the underlying glass, said oxide component exhibiting higher chemical or mechanical durability than the glass itself.

According to the first and second aspects of the present invention, glass at the surface is tailored by a dry process, preferably by exposure to active radiation, especially light whereby photoreaction converts the glass surface layer into a layer containing an oxide component having high chemical and mechanical durability in more excess than in the underlying base glass. The glass surface layer is reinforced by tailoring to a specific oxide component rich layer, typically a silicon oxide rich layer so that abrasion resistance and durability, especially chemical durability are improved.

The glass to be surface reinforced herein is not substantially limited in composition and physical properties. The glass surface layer can be tailored as by exposure to active radiation without a complicated step, leaving an increased freedom of choice of glass. This is advantageous for magnetic heads wherein components are welded and bonded preferably using a sealing glass having a relatively low working temperature.

Since the surface reinforcement is carried out at the final step of an article (e.g., magnetic head) manufacture process by a dry process as by exposure to active radiation, any deteriorated layer induced in the glass surface by surface polishing or other steps can be simultaneously eliminated.

A magnetic head of the composite type or the like having a surface-reinforced glass at the weld or joint has improved reliability because the sealing glass has high chemical durability at the exposed surface.

BRIEF DESCRIPTION OF THE ACCOMPANYING DRAWINGS

DETAILED DESCRIPTION OF THE INVENTION

The surface-reinforced glass of the present invention has a surface layer on an underlying base glass containing at least one oxide component. The surface layer contains the oxide component in more excess than the underlying glass, the oxide component exhibiting higher chemical or mechanical durability than the base glass itself.

The type of base glass (simply referred to glass hereinafter) used herein is not particularly limited and includes all well-known compositions of glass. A proper glass composition may be chosen for a particular application intended.

The oxide component capable of improving the durability, especially chemical durability of a glass surface layer is preferably silicon oxide, more exactly silicon dioxide $SiO_2$. Thus, the preferred glasses contemplated herein are glasses containing silicon oxide. Besides, the oxide component capable of improving the durability of a glass can be aluminum oxide.

The invention is more effective when the glass contains at least 2% by weight of silicon oxide. In the practice of the present invention, best results are obtained with glasses containing 4 to 35% by weight, more preferably 4 to 30% by weight, most preferably 5 to 25% by weight of silicon oxide and having a working temperature of up to 700° C., more preferably 400° to 700° C.

The glass may contain any ingredients other than silicon oxide and such other ingredients may be determined for a particular application. The invention becomes more effective with glasses containing at least 40% by weight, especially 40 to 85% by weight of at least one heavy metal oxide selected from the group consisting of lead oxide (PbO), bismuth oxide ($Bi_2O_3$), thallium oxide ($Tl_2O$), cadmium oxide (CdO), and tellurium oxide ($TeO_2$) in addition to silicon oxide, with the PbO being preferred. With this composition, the dry process which will be described later in detail induces substantial disappearance of the heavy metal oxide from the surface and formation of a $SiO_2$ rich layer. In addition, the glass may contain at least one of aluminum oxide ($Al_2O_3$), boron oxide ($B_2O_3$), and mono- to trivalent metal oxides such as zinc oxide (ZnO).

A surface layer of a base glass can be modified to an appropriate composition, for example, by a dry process. The dry process includes exposure to active radiation.

Figure 1:
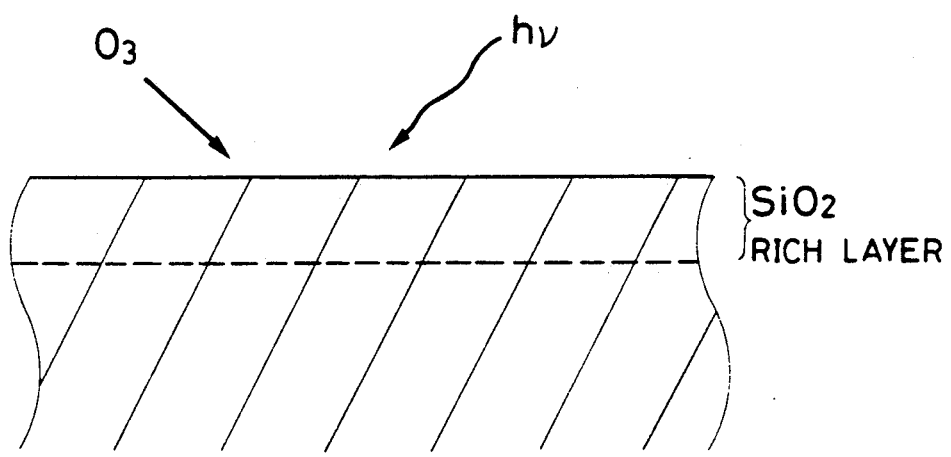
FIG. 1 is a schematic cross section of a glass having a surface layer tailored into a $SiO_2$ rich layer by radiation exposure.

Among various modes of exposure to active radiation, exposure of a glass surface to radiation or light in an ozone atmosphere is preferred because of selective surface reinforcement of glass, simplicity of equipment, and ease of surface reinforcement and control. As shown in FIG. 1, a surface of glass is exposed to radiation hv and to ozone at the same time. In the illustrated example, the surface layer of glass is tailored into a $SiO_2$ rich layer lying on the base glass.

The radiation used herein is preferably ultraviolet (UV) radiation. Oxygen can convert into ozone by absorbing UV radiation. The wavelength at which ozone is produced is of the order of 180 nm whereas ozone has an absorption band centering at 260 nm. Continuous formation and decomposition of ozone occurs if rays having wavelengths of about 180 nm and about 260 nm are concurrently available. Formation and decomposition of ozone is accompanied by production of atomic oxygen which is believed to greatly contribute to better results according to the present invention.

A preferred radiation source is capable of emitting radiation components having wavelengths of about 250 to 270 nm and about 170 to 190 nm. One useful source is a low pressure mercury discharge lamp capable of emitting UV radiation having wavelengths of 184.9 nm and 253.7 nm. Medium and high pressure mercury discharge lamps are also useful for some glasses.

The radiation source should preferably have an output power of about 50 to 700 watts, more preferably about 400 to 700 watts. The radiation source of such rating may be located at a distance of about 3 to 10 mm from an object to be exposed, that is, glass or an article. The exposure time may range from about 10 to about 90 minutes, preferably from about 30 to about 60 minutes.

The atmosphere under which an object is exposed to UV radiation is typically clean air or oxygen under atmospheric pressure. The atmosphere may have an oxygen partial pressure of 0.05 to 1 atmosphere, preferably of the order of air under atmospheric pressure prior to UV exposure.

The object to be exposed to UV, that is, a glass mass or an article containing glass (e.g., a magnetic head) is preferably heated at a temperature of up to 200° C., more preferably 50° to 200° C., most preferably 70° to 150° C. Heating above 200° C. is permissible to UV exposure, but not recommended from another consideration that the object is rapidly cooled upon its removal from within the processing chamber so that the glass portion would crack due to thermal shocks applied thereby.

The glass surface layer thus modified by UV exposure in the presence of ozone may have a thickness of from about 10 to 500 Å, preferably from about 50 to 300 Å, more preferably from about 50 to 200 Å.

The modified surface layer now contains at least 90% by weight, more preferably at least 95% by weight of the selected oxide component at or immediately below the surface. A thin transition region is usually present between the modified surface layer and the base glass. The term "at or immediately below the surface" is used herein to designate a surface layer within the thickness range measurable by ESCA (electron spectroscopy for chemical analysis) or AES (Auger electron spectroscopy), generally the thickness range having a depth of 50 Å, especially 20–30 Å from the surface. Usually, upon ESCA or AES measurement with etching, a $SiO_2$ content of at least 90% by weight is measured as an average over a range of etching from the surface to 100 Å.

The oxide component contained in the modified surface layer in more excess than in the base glass is preferably silicon oxide as previously described although it may be aluminum oxide. Preferred is silicon oxide in the form of $SiO_2$.

The reason why a surface layer rich in a specific oxide component, typically silicon oxide is formed is not clearly understood. It has been found that a silicon oxide rich layer is formed with difficulty upon exposure to limited UV radiation having a wavelength of 253.7 nm at which ozone is not produced or exposure to UV radiation in vacuum and that a silicon oxide rich layer can be efficiently formed in increased reproductivity upon exposure to a spectrum of UV radiation in which formation and decomposition of ozone take place at the same time. Based on these findings, we suppose that interaction of UV radiation with $O_3$ and O provides a type of photochemical reaction which would cause a heavy metal component such as PbO to disappear from the surface and a silicon oxide-rich layer to form at the surface.

A thickness direction profile of composition on analysis indicates that a specific oxide component-rich layer, especially a silicon oxide-rich layer is formed in lieu of a loss of a heavy metal oxide(s), especially lead oxide. For a base glass initially containing PbO, an ESCA or AES analysis of an outermost surface will give a Si/Pb ratio of at least 100, preferably at least 200, especially at least 1,000 after modification or reinforcement.

Analysis of the content of oxide components including silicon oxide may be carried out by ESCA or AES as previously described, which involves measuring the oxide component content in a thickness direction while etching with Ar gas or the like.

For the practice of reinforcement of a surface of glass as described above, a commercially available UV-ozone cleaning equipment may be used.

The glass having a reinforced surface may find a variety of applications including various glass articles such as glass dishes, beakers, containers, automobile windshields, eyeglasses lenses, and glazings; sealing glass as found in magnetic heads in which glass is exposed at the sliding surface of the head; reinforcing glass as found in magnetic heads in which glass stiffens the junction between cores; glass moldings, glass coatings, and glass seals as in electronic parts such as diodes, reed switches, and thermistors; various cover glasses; and other sealing and fusion welding glasses.

Next, the magnetic head of the invention will be described. The magnetic head may be of the type wherein sealing or welding glass is exposed at the sliding or front face or of the type wherein core halves are mated together and the core block is bound to a slider with sealing glass so that the sealing glass is exposed at the sliding surface. At the end of assembly of a magnetic head, the sealing glass at the exposed surface is exposed to radiation to form a surface-reinforced layer containing in more excess an oxide component having high chemical or mechanical durability, typically a silicon oxide rich layer.

Reference is now made to a flying magnetic head of the composite type as one preferred embodiment.

Figure 7:
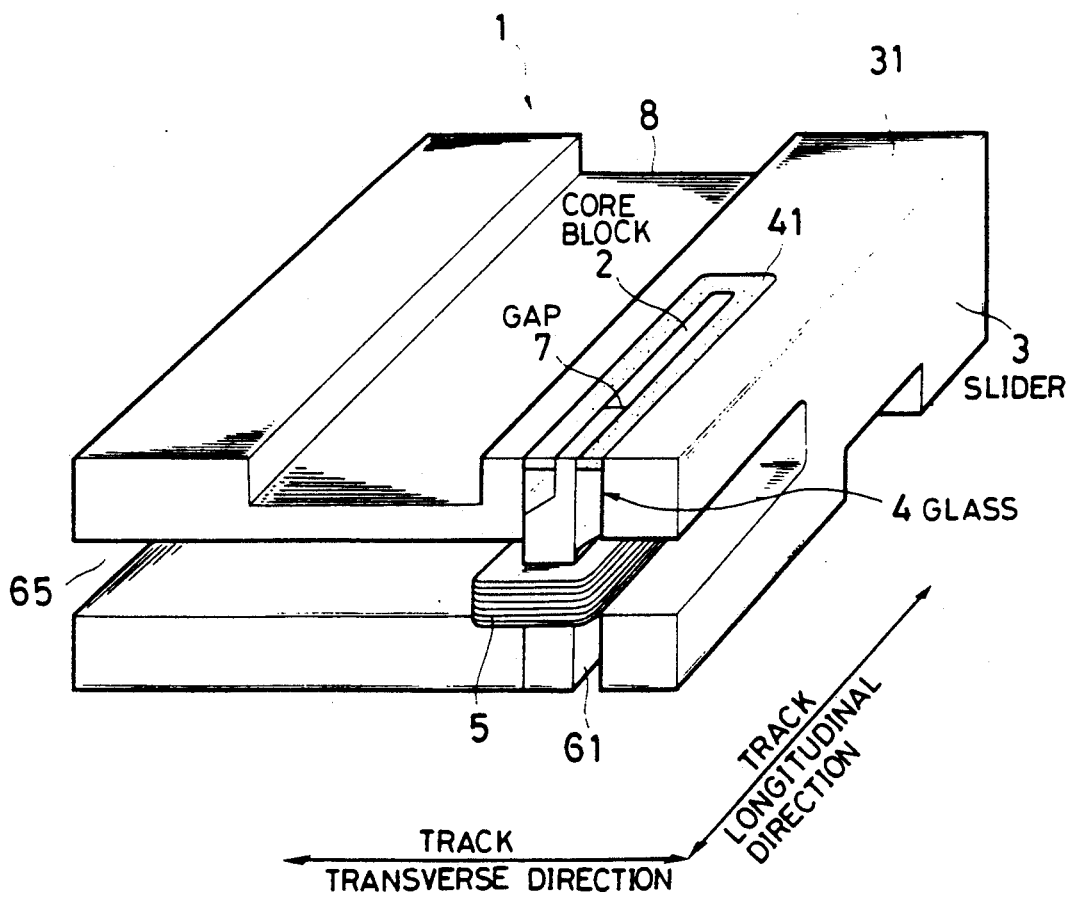
FIG. 7 is a perspective view of a flying magnetic head of the composite type according to one embodiment of the present invention.

FIG. 7 illustrates a flying magnetic head of the composite type according to one embodiment of the present invention. The head generally designated at 1 includes a core block 2 consisting of a pair of ferrite core halves butt jointed via a gap 7. The core block may be a magnetic head core block of the so-called MIG, DGL (dual gap length), or EDG (enhanced dual gap length) type wherein a high saturation magnetic flux density alloy thin film and/or low saturation magnetic flux density alloy thin film is formed on the gap facing surface of each core half. The ferrite used herein is not critical although an Mn-Zn or Ni-Zn ferrite is preferably used for a particular purpose.

The core block 2 in the form of mated core halves has the gap 7 formed at the front face. The gap 7 is usually formed to a predetermined track width by machining the front face side of the core block 2. The gap 7 is generally formed of a non-magnetic material, typically a borosilicate glass, silica-alkali glass, lead silicate glass and $SiO_2$. The glass of which the gap 7 is formed can be surface strengthened according to the present invention. The core block 2 with the gap 7 defines a track having longitudinal and transverse directions shown by arrows.

The core block 2 is prepared by mating core halves each other via the gap 7 under heat and pressure while introducing welding glass therebetween. The welding glass is preferably a lead silicate glass having a desired working temperature, for example, in the range of 450° to 850° C. The welding glass may also be surface strengthened according to the present invention after fusion welding so as to improve its chemical durability.

Particularly when an amorphous magnetic metal thin film intervenes in the gap of a so-called MIG, DGL, or EDG type head, it is preferred to use a low-melting point high lead glass as the welding glass in order to prevent crystallization of the thin film. The surface reinforcement according to the present invention is effective for this welding glass.

Each core half has a winding 5 thereon. The winding 5 is preferably provided after the core block 2 is joined and welded to a slider 3 with a sealing glass 4. The slider 3 is generally formed of a non-magnetic ceramic material such as potassium titanate, calcium titanate, strontium titanate, and crystalline glass. The slider 3 is provided with a channel 61 for receiving the core block therein and an access channel 65 for allowing formation of the winding 5. The slider 3 has a sliding or front surface 31 and a groove 8 for aerodynamic purposes.

The core block 2 is joined and welded to the slider 3 as shown in FIG. 7 by introducing the sealing glass 4 therebetween, with one end surface of the core block 2 in the track transverse direction placed in abutment with the core block receiving channel 61.

The sealing glass 4 used herein is preferably a lead silicate glass having a relatively low working temperature, especially alkali-free lead silicate glass so that the glass gap 7 in the core block 2 would not soften during the sealing operation.

The preferred lead silicate glass having a relatively low working temperature includes those containing at least 4% by weight, especially 4 to 30% by weight of $SiO_2$ and at least 40% by weight, especially 40 to 85% by weight of PbO. For these glasses, formation of a silicon oxide rich layer as a surface layer results in significant improvements in chemical durability as well as mechanical strength. More preferred are lead silicate glasses containing at least one member of $B_2O_3$, $Al_2O_3$, ZnO, and $Bi_2O_3$ in addition to the silicon oxide and lead oxide components defined above. More particularly, $B_2O_3$ is preferably present in an amount of up to 15% by weight, more preferably up to 6% by weight, and at least 1% by weight when contained as an essential ingredient, $Al_2O_3$ is preferably present in an amount of up to 7% by weight, more preferably up to 5% by weight, and at least 1% by weight when contained as an essential ingredient, ZnO is preferably present in an amount of up to 10% by weight, more preferably up to 7% by weight, and at least 1% by weight when contained as an essential ingredient, and $Bi_2O_3$ is preferably present in an amount of up to 50% by weight, more preferably up to 30% by weight, and at least 10% by weight when contained as an essential ingredient. It is to be noted that when there is present more than 20% by weight of $SiO_2$, an alkali oxide or oxides such as $Na_2O$ and $K_2O$ may be contained in a total amount of up to 7% by weight. The lead silicate glass of the above-mentioned composition usually has a working temperature Tw of about 450° to about 700° C.

After the core block 2 is integrated with the slider 3 by seal welding, the sliding surface is polished. The surface of the sealing glass 4 exposed at the sliding surface is tailored into a SiO₂ rich layer 41 by radiation exposure, completing the magnetic head 1. In FIG. 7, the sealing glass 4 is illustrated as having the surface layer 41 which has been tailored by the surface reinforcement of the present invention into a surface-reinforced layer such as a silicon oxide rich layer.

In the radiation exposure step, a UV/ozone cleaning equipment may be used in which a low-pressure mercury lamp emits UV radiation at wavelengths of 184.9 nm and 253.7 nm.

The thus fabricated magnetic head 1 shows dramatically improved reliability because the front surface of the sealing glass 4 has improved durability, especially chemical durability.

Additionally, the radiation exposure can simultaneously eliminate any undesirably modified layer which can be formed on the glass surface by surface polishing or the like. This leads to reduction and simplification of the manufacturing process.

Although the flying magnetic head of the composite type illustrated in FIG. 7 has been described as one preferred embodiment of the invention, the present invention is not limited thereto. Although the entire periphery of the core block on the sliding surface is surrounded by the glass in the flying magnetic head of the composite type, it is contemplated that at least one of the opposite ends of the core block in track longitudinal and transverse directions is surrounded by the glass. The present invention is effective in any of these arrangements.

In addition, also contemplated herein are magnetic heads of the type wherein sealing glass is exposed at the sliding surface, for example, monolithic magnetic heads in which opposed ends of a gap in a core block are sealed with glass, and non-flying magnetic heads, especially bulk type floppy magnetic heads, video magnetic heads, and DAT magnetic heads. In either of these cases, the magnetic head is subjected to radiation and ozone to form a specific oxide (silicon oxide) rich reinforced layer at the surface of the sealing and welding glasses.

The magnetic head of the invention is often integrated with a slider and mounted on a suitable member to form a head assembly.

The magnetic heads of the invention are useful as floppy heads of the tunnel erase type and the read/write type for overwrite recording without an erase head, flying heads of the monolithic and composite types for computers, rotary heads for VCR, heads for R-DAT and the like. The use of the magnetic heads of the invention enables overwrite recording in various well-known modes.

EXAMPLE

Examples of the present invention are given below by way of illustration and not by way of limitation.

EXAMPLE 1

A glass of the following composition having a working temperature Tw of 565° C. was prepared.

| Glass composition | |
|---|---|
| SiO₂ | 15% by weight |
| Al₂O₃ | 2% by weight |
| B₂O₃ | 4% by weight |
| Bi₂O₃ | 10% by weight |
| PbO | 69% by weight |

The glass was exposed to UV radiation from a low pressure mercury lamp under the following conditions, obtaining glass sample No. 1 in which a SiO₂ rich layer was formed at the surface. A UV-ozone cleaning equipment was utilized for UV radiation exposure.

UV radiation power: 500 watts
UV exposure time: 1 hour
Lamp-to-glass distance: 5 mm
Atmosphere: air, atmospheric pressure
Glass temperature: 150° C.

Figure 2:
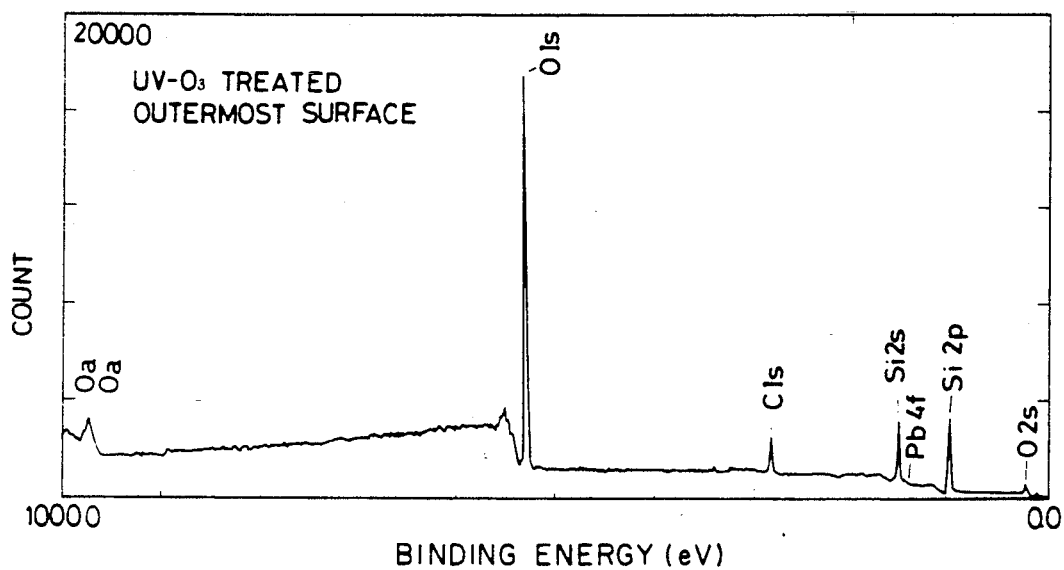
FIG. 2 is an ESCA spectrum of UV/ozone treated glass at its outermost surface.
Figure 3:
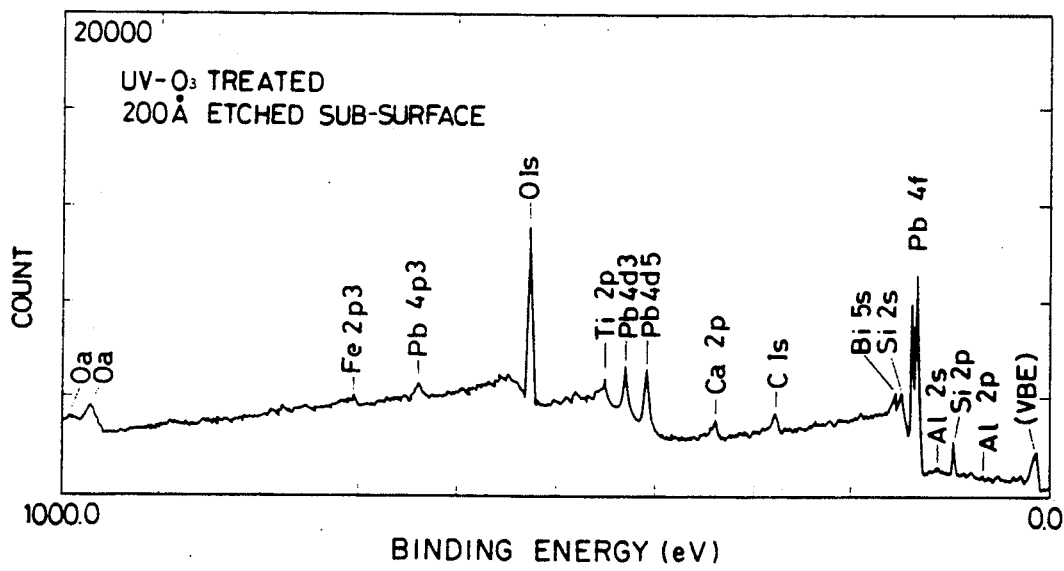
FIG. 3 is an ESCA spectrum of UV/ozone treated glass at a level etched 200 Å from its outermost surface.
Figure 6:
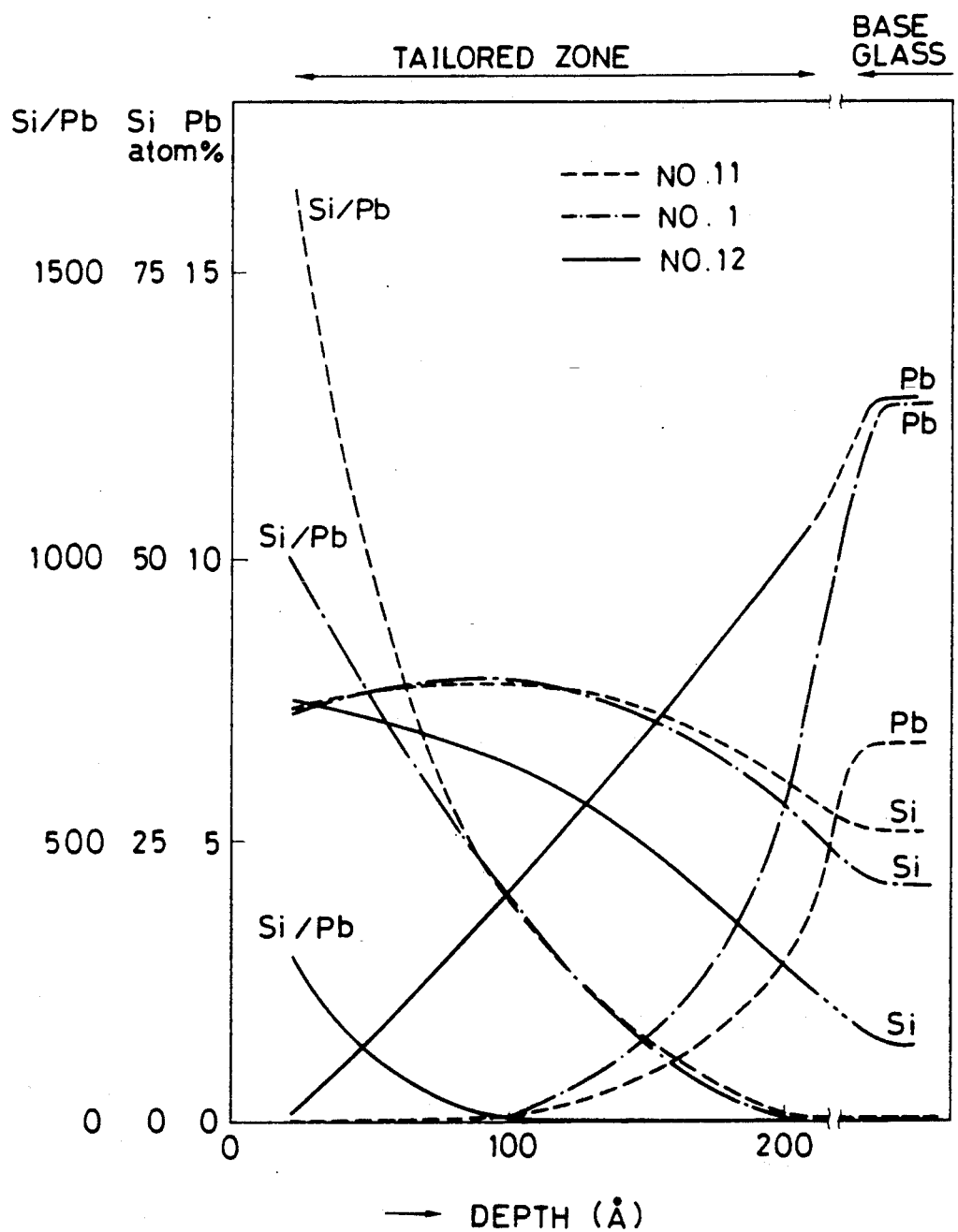
FIG. 6 is a diagram showing a compositional profile in a thickness direction of UV/ozone treated glass.

The UV/ozone treated glass was analyzed by μ-ESCA at the outermost surface and sub-surfaces etched with argon gas to 100 Å and 200 Å. The results are shown in FIGS. 2 and 3 and Table 1. FIG. 6 shows profiles of Si/Pb atomic ratio, Si and Pb contents (in atom %) in a thickness direction.

Figure 4:
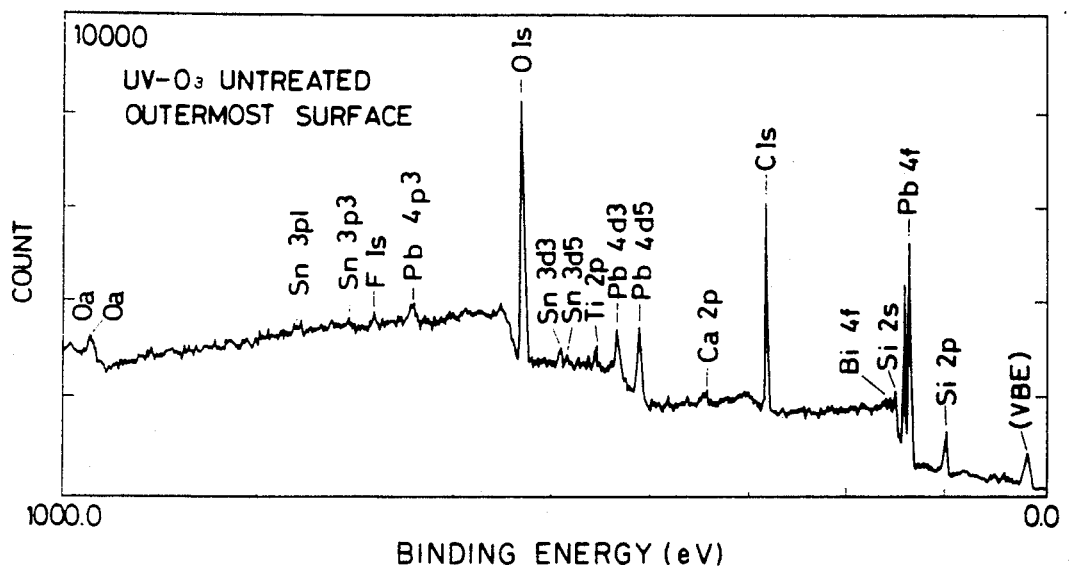
FIG. 4 is an ESCA spectrum of untreated glass at its outermost surface.
Figure 5:
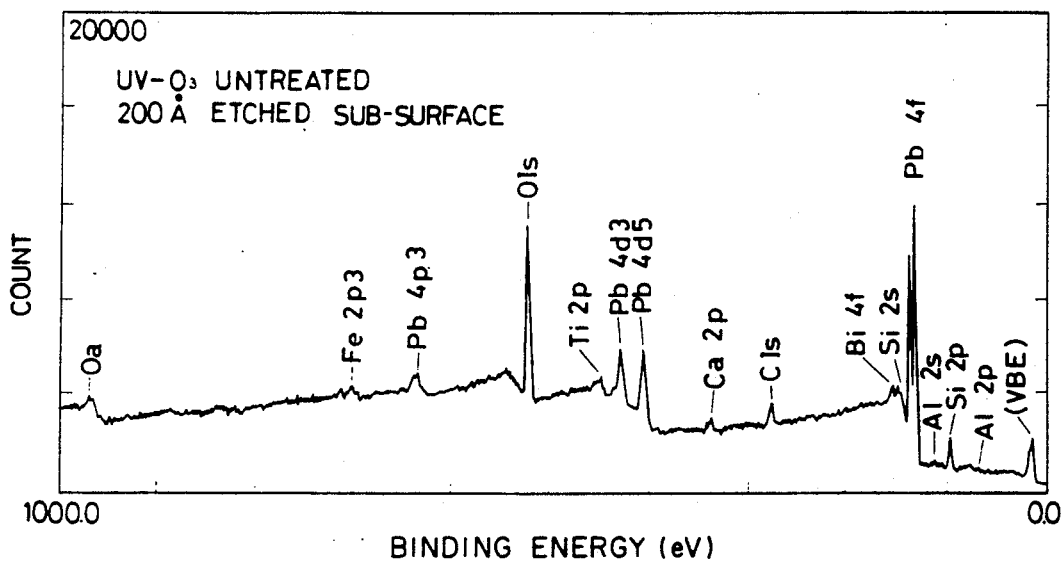
FIG. 5 is an ESCA spectrum of untreated glass at a level etched 200 Å from its outermost surface.

A glass sample without UV/ozone treatment, designated sample No. 2, was similarly analyzed by ESCA. The results are shown in FIGS. 4 and 5 and Table 1.

TABLE 1

| Sample No. | UV/O₃ treat | | Composition (at %) | | | | | Si/Pb atom ratio (Theoret. 0.81) |
|---|---|---|---|---|---|---|---|---|
| | | | Si | Al | Bi | O | Pb | |
| 1 | Yes | outermost | 36.3 | — | — | 63.7 | 0.03 | 1200 |
| | | 100 Å etched | 39.2 | — | — | 60.7 | 0.1 | 390 |
| | | 200 Å etched | 26.0 | 3.0 | 0.2 | 65.2 | 5.6 | 4.6 |
| 2 | No | outermost | 22.2 | 0.93 | 2.55 | 60.2 | 14.1 | 1.6 |
| | | 200 Å etched | 21.1 | 3.8 | 0.5 | 61.8 | 12.7 | 1.7 |

As seen from Table 1 and FIGS. 2 through 6, the UV/ozone treatment according to the present invention caused a silicon oxide-rich layer consisting essentially of SiO₂ (estimated SiO₂ content at least 90% by weight) to form immediately below the surface with a loss of Pb therefrom. The modified layer containing at least 90% by weight of SiO₂ was presumed to range up to 200 Å, especially from 50 to 150 Å in thickness.

For comparison purposes, the same glass was subjected to UV radiation exposure under a low pressure mercury lamp under the same conditions as sample No. 1 except that the atmosphere was a vacuum (up to $10^{-3}$ Torr). This UV treated sample, designated sample No. 3, showed essentially the same ESCA spectrum as untreated sample No. 2.

Sample Nos. 1, 2, and 3 were further evaluated for the following properties.

(1) Reactivity with S and Cl gases

A glass sample was placed in a polyvinyl chloride case which was sealed with polyvinyl chloride and maintained in an atmosphere at a temperature of 60° C. and a humidity of 95% RH for 24 hours. The glass surface was then observed for any change.

(2) Humidity resistance

A glass sample was allowed to stand in an atmosphere at a temperature of 40° C. and a humidity of 95% RH for 96 hours. The glass surface was then observed for any change.

The results are shown in Table 2. It is to be noted that the data under the heading "Abrasion resistance" in Table 2 are of Example 5 described later.

TABLE 2

| Sample No. | Sealing glass composition (wt %) | Tw (°C.) | Treatment | $SiO_2$ rich layer thickness (Å) | S/Cl gas reactivity | Humidity resistance | Abrasion resistance |
|---|---|---|---|---|---|---|---|
| 1 | $SiO_2(15)$—PbO(69)—$B_2O_3(4)$—$Bi_2O_3(10)$—$Al_2O_3(2)$ | 565 | $UV$—$O_3$ 1 hr | 50~150 | No change | No change | No change |
| 2* | $SiO_2(15)$—PbO(69)—$B_2O_3(4)$—$Bi_2O_3(10)$—$Al_2O_3(2)$ | 565 | None | Absent | Surface embrittled | Surface discolored | Scratches |
| 3* | $SiO_2(15)$—PbO(69)—$B_2O_3(4)$—$Bi_2O_3(10)$—$Al_2O_3(2)$ | 565 | UV | Absent | Surface embrittled | Surface discolored | Scratches |
| 4 | $SiO_2(15)$—PbO(69)—$B_2O_3(4)$—$Bi_2O_3(10)$—$Al_2O_3(2)$ | 565 | $UV$—$O_3$ 2 hr | 50~150 | No change | No change | No change |
| 5 | $SiO_2(21)$—PbO(56)—$B_2O_3(3)$—$Bi_2O_3(15)$—$Al_2O_3(2)$—$Na_2O(2)$—$K_2O(1)$ | 625 | $UV$—$O_3$ 1 hr | 50~150 | No change | No change | No change |
| 6 | —$SiO_2(25)$—PbO(52)—$B_2O_3(1)$—$Bi_2O_3(15)$—$Al_2O_3(2)$—$Na_2O(2)$—$K_2O(3)$ | 685 | $UV$—$O_3$ 1 hr | 50~150 | No change | No change | No change |
| 7 | $SiO_2(6.9)$—PbO(76.2)—$B_2O_3(8.1)$—ZnO(5.8)—$Al_2O_3(3)$ | 502 | $UV$—$O_3$ 1 hr | 50~150 | No change | Less scratches | Less scratches |
| 8* | $SiO_2(6.9)$—PbO(76.2)—$B_2O_3(8.1)$—ZnO(5.8)—$Al_2O_3(3)$ | 502 | None | Absent | Surface embrittled | Surface discolored markedly | Scratches |

*Outside the scope of the invention

As seen from Table 2, the glass treated according to the present invention has outstandingly improved chemical durability.

Sample Nos. 2 and 3 after the S/Cl corrosion test were analyzed at the surface by ESCA, finding that the surface was whitened due to formation of $PbSO_4$ and $PbCl_2$.

The samples were also measured for Vickers hardness to find that the hardness of the sample of the invention was improved about 10% over the comparative samples.

In an abrasion test, lesser mars or scratches occurred on the surface of the sample of the invention than on the comparative samples.

These results show that the surface-reinforced glass of the present invention is also improved in mechanical strength and abrasion resistance.

EXAMPLE 2

Glasses having the compositions shown as sample Nos. 4 to 7 in Table 2 were surface reinforced by the same UV/ozone treatment as in Example 1. The treating time was changed as reported in Table 2.

For comparison purposes, sample No. 8 was not surface reinforced by a UV/ozone treatment.

Sample Nos. 4 to 8 were tested as in Example 1. The results are also shown in Table 2.

EXAMPLE 3

A glass having the following composition, designated sample No. 11, was surface reinforced by the same UV/ozone treatment as in Example 1.

| Glass sample No. 11 | |
|---|---|
| $SiO_2$ | 25.5% by weight |
| $Al_2O_3$ | 2.0% by weight |
| $B_2O_3$ | 1.5% by weight |
| PbO | 52.3% by weight |
| $Bi_2O_3$ | 15.0% by weight |
| $Na_2O$ | 2.0% by weight |
| $K_2O$ | 3.0% by weight |
| $As_2O_3$ | 0.2% by weight |

The sample was analyzed by $\mu$-ESCA, with the results shown in Table 3 and FIG. 6.

TABLE 3

| Sample No. | $UV/O_3$ treat | | Composition (at %) | | | | | | | Si/Pb atom ratio (Theoret. 1.81) |
|---|---|---|---|---|---|---|---|---|---|---|
| | | | Si | Al | Bi | Na | K | O | Pb | |
| 11 | No | outermost | 19.2 | 2.2 | 2.6 | 1.4 | 1.4 | 59.8 | 7.1 | 2.7 |
| | | 200 Å etched | 25.8 | 2.7 | 1.2 | 1.4 | 2.4 | 59.9 | 6.7 | 3.9 |
| | Yes | outermost | 36.9 | 0.2 | — | 0.1 | 0.1 | 62.7 | — | ∞ |
| | | 100 Å etched | 39.0 | — | — | — | — | 60.9 | 0.1 | 390 |
| | | 200 Å etched | 30.3 | 3.2 | 0.4 | 1.3 | 1.5 | 60.3 | 2.9 | 10 |

EXAMPLE 4

A glass having the following composition, designated sample No. 12, was surface reinforced by the same UV/ozone treatment as in Example 1.

| Glass sample No. 12 | |
|---|---|
| $SiO_2$ | 4.9% by weight |
| $Al_2O_3$ | 3.0% by weight |
| $B_2O_3$ | 10.1% by weight |
| PbO | 76.2% by weight |
| ZnO | 5.8% by weight |

The sample was analyzed by $\mu$-ESCA, with the results shown in Table 4 and FIG. 6.

TABLE 4

| Sample No. | UV/O₃ treat | | Composition (at %) | | | | | | Si/Pb atom ratio (Theoret. 0.24) |
|---|---|---|---|---|---|---|---|---|---|
| | | | Si | Al | B | Zn | O | Pb | |
| 12 | No | outermost | 8.6 | 5.7 | 5.9 | 1.2 | 64.3 | 14.8 | 0.58 |
| | | 200 Å etched | 6.8 | 5.7 | 18.5 | 2.2 | 54.1 | 12.8 | 0.53 |
| | Yes | outermost | 37.5 | 0.4 | — | — | 61.9 | 0.1 | 380 |
| | | 100 Å etched | 31.8 | 1.8 | 2.2 | 0.1 | 60.1 | 4.0 | 8.0 |
| | | 200 Å etched | 14.0 | 6.7 | 9.0 | 1.4 | 59.0 | 9.9 | 1.4 |

EXAMPLE 5

A ferrite core block and a ceramic slider were joined and sealed as shown in FIG. 7 using a sealing glass having the same composition as used in Example 1 and a working temperature Tw of 565° C. Thereafter the sliding face was polished.

The sliding face was exposed to UV radiation from a low-pressure mercury lamp under the same conditions as in Example 1 to form an $SiO_2$ rich layer on the surface of the sealing glass, obtaining composite type flying magnetic head sample No. 1. A UV-ozone cleaning equipment was utilized for UV radiation exposure.

The UV/ozone treated glass was analyzed by μ-ESCA at the outermost surface and sub-surfaces etched with argon gas to 100 Å and 200 Å. The results are shown in FIGS. 2 and 3 and Table 1. FIG. 6 shows profiles of Si/Pb atomic ratio, Si and Pb contents (in atom %) in a thickness direction.

A sample without UV/ozone treatment, designated sample No. 2, was similarly analyzed by ESCA. The results are shown in FIGS. 4 and 5 and Table 1.

As seen from Table 1 and FIGS. 2 through 6, the UV/ozone treatment according to the present invention caused a silicon oxide-rich layer consisting essentially of $SiO_2$ (estimated $SiO_2$ content at least 90% by weight) to form immediately below the surface with a loss of Pb at the surface. The modified layer containing at least 90% by weight of $SiO_2$ was presumed to range up to 200 Å, especially from 50 to 150 Å in thickness.

For comparison purposes, the same glass was subjected to UV radiation exposure under a low pressure mercury lamp under the same conditions as sample No. 1 except that the atmosphere was a vacuum (up to $10^{-3}$ Torr). This UV treated sample, designated sample No. 3, showed essentially the same ESCA spectrum as untreated sample No. 2.

Sample Nos. 1, 2, and 3 were further evaluated for the following properties.

(1) Reactivity with S and Cl gases

A magnetic head sample was placed in a polyvinyl chloride case which was sealed with polyvinyl chloride and maintained in an atmosphere at a temperature of 60° C. and a humidity of 95% RH for 24 hours. The glass surface was then observed for any change.

(2) Humidity resistance

A magnetic head sample was allowed to stand in an atmosphere at a temperature of 40° C. and a humidity of 95% RH for 96 hours. The glass surface was then observed for any change.

(3) Abrasion resistance

A magnetic head sample was mounted to a magnetic head device and subjected to a contact start and stop (CSS) test of 10,000 cycles. The glass surface was observed for scratches under a microscope.

The results are shown in Table 2.

As seen from Table 2, the magnetic head according to the present invention has outstandingly improved chemical durability due to the presence of a silicon oxide rich layer at the surface of the sealing glass.

Sample Nos. 2 and 3 after the S/Cl corrosion test were analyzed at the surface by ESCA, finding that the surface was whitened due to formation of $PbSO_4$ and $PbCl_2$.

The results show that the surface-reinforced glass of the present invention is also improved in mechanical strength and abrasion resistance.

EXAMPLES 6-8

Magnetic heads were fabricated by the same procedure as in Example 5 using glass samples of Examples 2-4. Equivalent results were found. No adverse effect by UV/ozone exposure was noticed on the core and slider areas adjoining the glass.

Equivalent results were found with respect to the glass forming the gap between the core halves.

There has been described a surface-reinforced glass in which a surface layer lies on a base glass wherein the surface layer contains an oxide component exhibiting high chemical and mechanical durability, typically silicon oxide in more excess than the base glass. The entire glass shows improved abrasion resistance and durability, especially chemical durability.

A surface layer of glass may be modified by a dry process, typically exposure of a glass surface to radiation in the presence of ozone. The dry process has many advantages of eliminating any limitations on the physical properties of glass and ensuring an increased freedom of choice of glass composition. It requires no complicated steps and allows the remaining glass other than the glass surface to maintain its properties.

Since the surface modification according to the present invention is carried out at the final step of a manufacture process, it has an accompanying advantage of simultaneously removing any deteriorated layer on the glass surface.

When a UV/ozone cleaning equipment is used for surface reinforcement, the equipment also serves for its principal function of cleaning so that a very clean glass surface is eventually obtained.

The glass does not lose transparency. A change of index of refraction is negligible because the modified surface layer is very thin.

There has also been described a magnetic head having a sealing glass whose surface layer is tailored into a reinforced layer containing an oxide component exhibiting high chemical and mechanical durability, typically silicon oxide in more excess than the underlying base glass. The magnetic head having a surface-reinforced sealing glass at the sliding face is outstandingly improved in reliability because the exposed glass surface exhibits improved abrasion resistance without local abrasion and improved chemical durability.

A surface layer of glass may be modified by a dry process, typically exposure of a glass surface to radiation in the presence of ozone. The dry process has many advantages including an increased freedom of choice of glass composition and no adverse effect on ferrite cores or the like. In addition, since glass can be surface reinforced almost independent of the glass composition, a glass having a low working temperature may be used in welding and sealing of magnetic head components.

Since the surface modification by active radiation exposure is carried out as the final step of a magnetic head manufacture process, it has an additional advantage of simultaneously removing any deteriorated layer on the glass surface as caused by surface polishing.

When a UV/ozone cleaning equipment is used for surface reinforcement, the equipment also serves for its principal function of cleaning so that a very clean sliding face is eventually obtained.

The glass does not lose transparency even after the formation of a silicon oxide rich layer. A change of index of refraction is negligible because the silicon oxide rich layer is very thin.

A silicon oxide rich layer or surface-reinforced layer can be formed on an exposed surface of a sealing glass by simply exposing the surface to radiation in the presence of ozone without any complicated step or without lowering the productivity of magnetic heads.

We claim:

1. A method for reinforcing a surface of a silica glass to improve the mechanical and chemical durability of the surface, comprising the steps of:

irradiating a surface of a glass substrate comprising at least 2 wt. % silicon oxide and at least 40 wt. % of a heavy metal oxide selected from the group consisting of PbO, $Bi_2O_3$, $Tl_2O$, CdO and $TeO_2$, with sufficient UV radiation to produce ozone in an atmosphere containing oxygen at a sufficient temperature, UV radiation intensity and wavelength, and for a time sufficient to produce an oxide having a Si/heavy metal atom ratio of at least 100 in a 10–500 Å thick surface layer of said glass.

2. The method of claim 1, wherein said glass substrate comprises 4–35 wt. % silicon dioxide.

3. The method of claim 1, wherein said glass substrate comprises 4–30 wt. % silicon dioxide.

4. The method of claim 1, wherein said glass substrate comprises 5–25 wt. % silicon dioxide.

5. The method of claim 1, wherein said glass substrate has a working temperature of 400°–700° C.

6. The method of claim 1, wherein said irradiating step comprises irradiating with UV radiation having a wavelength in the range 170–190 nm and a wavelength in the range 250–270 nm, thereby providing continuous formation and decomposition of ozone.

7. The method of claim 1, comprising irradiating for 10–90 minutes.

8. The method of claim 1, comprising irradiating for 30–60 minutes.

9. The method of claim 1, comprising irradiating at a temperature of 50°–200° C.

10. The method of claim 1, comprising irradiating at a temperature of 70°–150° C.

11. The method of claim 1, wherein said ratio is at least 200.

12. The method of claim 1, wherein said ratio is at least 1,000.

13. The method of claim 1, wherein said irradiating step is conducted using a UV radiation source having an output power of about 50–700 watts.

14. The method of claim 1, wherein said irradiating step is conducted using a UV radiation source having an output power of about 400–700 watts.

15. The method of claim 1, wherein said heavy metal oxide is PbO.

* * * * *